Jan. 26, 1954

B. J. BAECHER 2,667,078

GYROSCOPE DAMPING DEVICE

Filed Aug. 25, 1950

INVENTOR.
BERNARD J. BAECHER
BY
ATTORNEYS

Patented Jan. 26, 1954

2,667,078

UNITED STATES PATENT OFFICE 2,667,078

GYROSCOPE DAMPING DEVICE

Bernard J. Baecher, Sea Cliff, N. Y.

Application August 25, 1950, Serial No. 181,541

6 Claims. (Cl. 74—5.5)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in gyroscopes, and more particularly pertains to improvements in gyroscope damping devices.

The pendulum ballistic, the controlling element that makes the sensitive element of a gyro-compass north seeking, is an inverted pendulum in conventional gyro-compass such as the Sperry Gyro-Compass Mark 18, Model 3. The unit consists essentially of an inverted pendulum weight that maintains the azimuth alignment and a repulsion magnet arrangement that damps any oscillations of the gyro about the meridian. The pendulum is a weight that is located around the north rotor bearing housing, said weight being supported by two semi-circular flat springs secured at one end to the rotor case. If the compass deviates from its true north position, the rotation of the earth will cause the rotor to tilt. The weight then will take up a position such that a torque is applied about the horizontal axis of the gyro. This torque causes the gyro to precess about its vertical axis to bring the compass back on the meridian. A metal plate or paddle, that moves in a direction perpendicular to its length in a vessel containing a viscous fluid is attached to the weight. This arrangement damps out oscillations of the weight caused by roll or pitch of the ship. Two repulsion magnets are used to provide torque about the vertical axis of the gyro to dampen oscillations of the compass about the meridian.

There are several disadvantages to the weight damping system above described. The movement of the paddle in a direction perpendicular to its length through a very viscous fluid provides a combination of viscous friction and spring action, there being a force opposing the motion proportional to the displacement caused by the fluid piling up in front of the paddle and acting like a compression-type spring. In addition, there is introduced the possibility of the pendulum being held out from the vertical by the fluid. Finally, the clearance between the supporting springs and the weight and the limit stops in the damper attached to the weight restrict the motion of the weigh to such an extent as to prevent application of the correct ballistic deflection under many operating conditions.

The foregoing disadvantages are overcome substantially by the subject device, which provides improved viscous damping of the pendulum, renders negligible the amount the pendulum is held out of the vertical by the damping suspension, minimizes compression forces in the viscous fluid, and provides ample clearances.

Generally, the damping system of the subject device provides a plurality of paddles moving in a direction parallel to their length through a plurality of troughs of damping fluid interconnected at their bottom. The direction of motion of the paddles, parallel to their length, provides almost pure shearing forces in the fluid, thereby providing retarding forces proportional to the velocity of movement of the paddles through the fluid and also reducing compression effects in the fluid and the tendency to hold the pendulum out of the vertical to a negligible amount.

In addition, with the pendulum-type suspension of the ballistic weight, the motion of the paddles is directly proportional to the motion of the center of gravity of the weight, so that uniform damping is obtained. Further, the employment of silicone as a damping fluid makes the effect of temperature variations on damping negligible, by reason of the low temperature coefficient of viscosity of such fluid. The viscosity of the fluid employed retards the swing out of the ballistic weight on short swings such as are obtained due to roll and pitch to a sufficient amount to minimize intercardinal rolling error but still permits the pendulum to swing out the proper amount to provide the correct ballistic deflection on high speed turns.

The gyro-compass damping structure disclosed incorporates clearances sufficient to permit response to as much plus or minus shift in the dynamic vertical as might be met under operating conditions, and also provides for linear motion of the weight on northerly accelerations.

Accordingly, it is a principal object of this invention to provide improved structure for damping the ballistic weight of a gyro-compass.

Another object is to provide improved damping structure for gyro-compasses, such structure being characterized by viscous damping of the pendulum, the elimination of the tendency of the pendulum to be held out of the vertical by the damping suspension, or the rendering of such factor negligible, and the minimization of compression forces in the viscous damping fluid.

Still another object is to provide, in a gyro-compass, a pendulous weight carrying a paddle that moves in a damping fluid in a direction parallel to its length to provide almost pure shearing forces in the fluid, so that the retarding forces are proportional to the velocity of movement of the paddle through the fluid and so that compression effects in the fluid and the tendency of the fluid to hold the pendulum out of vertical are reduced to a negligible amount.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
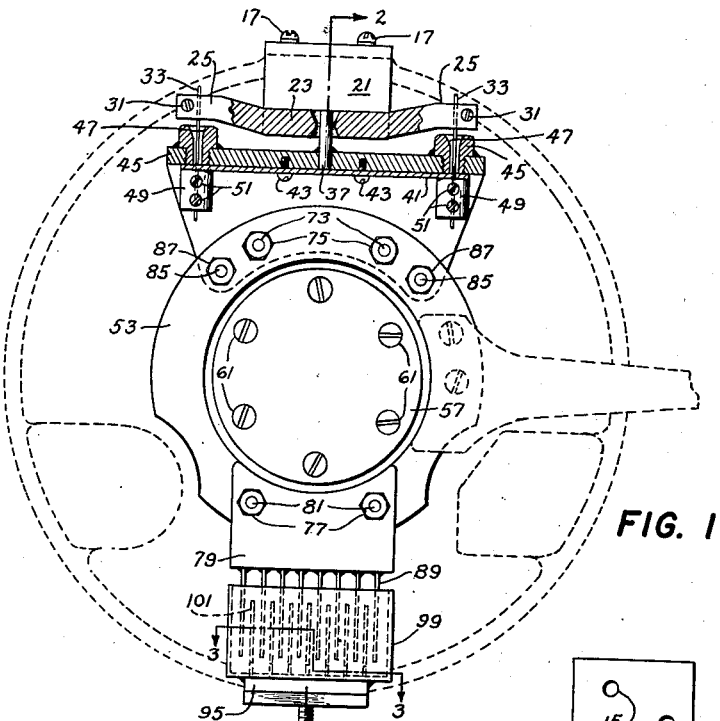
Fig. 1 is an elevation of a damping device for a gyro-compass, shown partly in section, and showing the gyro-compass rotor case and bearing in phantom, illustrating a preferred embodiment of the invention.
Figure 5:
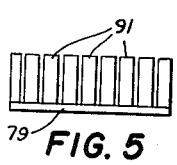
Fig. 5 is a plan view of the paddle-bracket member of the device.

The support member 11 comprises a first leg portion 13 having a plurality of bores 15 carrying screws 17 whereby said support is secured to the rotor case 19 of a gyro-compass, a body-plate portion 21 adapted to lie flush with said rotor case, and a second leg portion 23 extending outwardly from said rotor case normal to said body-plate portion. Arms 25 extend laterally from each side of said leg portion 23, and the end of each arm is provided with a slot 27 and a cross-bore 29 that is threaded to receive a screw 31, said slot and bore providing means to secure a flexible wire 33 that depends therefrom to provide a flexure type hinge. A bore 35 medial the forward portion of the leg portion 23 carries a fulcrum pin 37, said bore 35 being counterbored at both the upper and lower faces of said leg portion to permit said pin to rock in the manner hereinafter described.

Bracket 39 is an L-shaped plate having a plurality of bores in one leg aligned axially with the axes of the wires 33 and bore 35. The pin 37 is secured in one of said bores, as by tack welding of said pin to said leg, and the other of said bores are threaded to carry a wire-guiding assembly comprising nuts 45 having axially tapered bores 47. The nether ends of wires 33 are secured by the lugs 49 that have axial bores that receive said wires and hold said wires by means of the setscrews 51. The lugs 49 are secured to the nether face of spring 41 as by tack welding and the spring 41 is attached to the nether leg of bracket 39 by screws 43. Spring 41 is provided to prevent kinking of the suspension wires 33 by keeping such wires under tension at all times.

Figure 2:
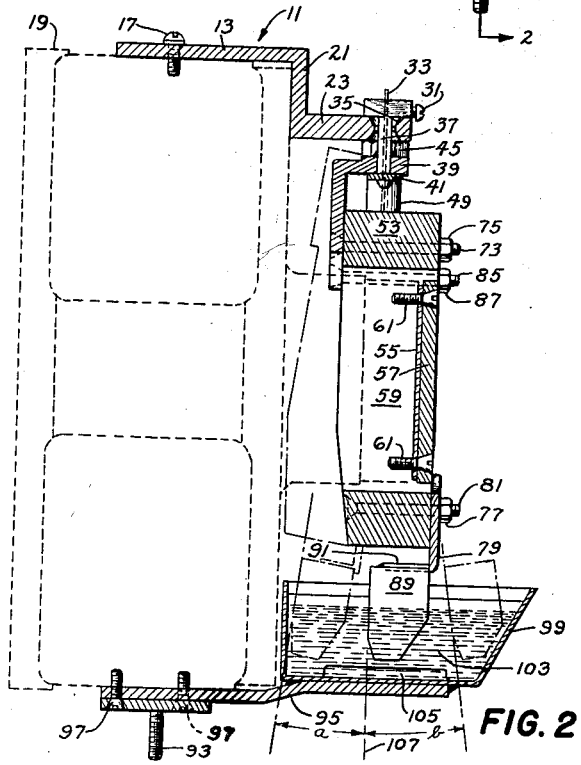
Fig. 2 is a section taken on the line 2—2 of Fig. 1, showing extended positions of the damping structure in broken lines.
Figure 4:
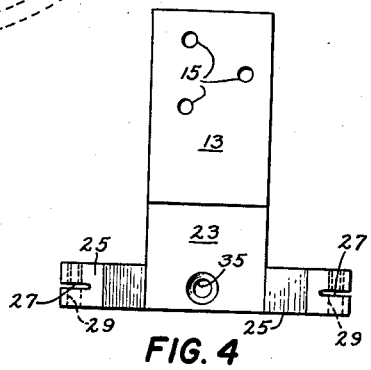
Fig. 4 is a plan view of the support member of the device.
Figure 3:
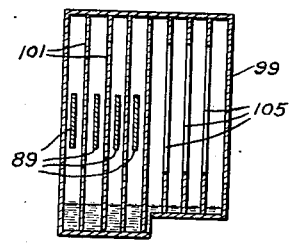
Fig. 3 is a section taken on the line 3—3 of Fig. 1.

Weight 53 is a lead annulus having a central opening of sufficient diameter to clear the protuberant portion of the bearing of rotor housing 19 when said weight is secured dependingly from bracket 39. The lower portion of said weight is of reduced thickness, as shown in Fig. 2, to increase the angular limit of swing thereof, as hereinafter described.

Gasket 55 and cap plate 57 are secured to the rotor bearing 59 by means of a plurality of screws 61 countersunk to lie flush with the face of said cap plate. Screws 81 and nuts 77 serve to secure bracket 79 to weight 53. The said weight 53 is also secured to bracket 39 by screws 85 and nuts 87.

A plurality of paddles 89 are secured to and depend from the legs 91 formed in the horizontally disposed portion of bracket 79, said paddles having their faces arranged in parallel spaced relation for movement in the plane of said faces.

Stud 93 and bracket 95 are secured to the rotor case 19 by screws 97. Said bracket 95 carries trough 99, which is subdivided into a plurality of compartments by spacer plates 101, communication of the fluid 103 between compartments being permitted through the slot 105 formed by the lower portion of each of said plates 101 and the floor of said trough. The spacer plates are so arranged that one of said paddles 89 can travel in the fluid in each of said compartments.

The damping fluid 103 is preferably a silicone fluid, which is characterized by its small temperature coefficient of viscosity, it being desirable to prevent variations in temperature from having an effect on the damping. Such fluid is of sufficient viscosity to retard the swing out of the ballistic weight on short swings, such as are obtained due to roll and pitch, to a sufficient amount to minimize intercardinal rolling error, but is not of such high viscosity as to prevent the pendulum from swinging out the proper amount to provide the correct ballistic deflection on high speed turns. A preferred fluid is Corning DC silicone Fluid No. 200, which has a viscosity at 25° C. of 200,000 centistokes The wire-suspended pendulum hereinabove described tends to hang in the dynamic vertical, shown by the broken line 107 of Fig. 2.

The paddles 89 move through the fluid 103 in a direction parallel to their length—in the plane of the faces of said paddles—and thereby provide almost pure shearing forces in the fluid. As a result, said paddles provide retarding forces proportional directly to the velocity of their movement through the fluid. Such orientation of the paddles also reduces to a negligible amount the compression effects in the fluid and the tendency of the fluid to hold the pendulum out of the vertical. True viscous damping, with changes in temperature having a negligible effect because of the small temperature coefficient of viscosity of the fluid employed, is therefore realized.

Obviously many modifications and variations of the present invention are possible in the light of the above teachings. The invention disclosed herein is applicable to gyroscopic stable verticals and like devices. The damping can be varied by varying the spacing of the paddles, the number and size of the paddles, and the viscosity of the fluid. The suspension means can be a wide range of equivalent devices. Other modifications and changes suggest themselves readily to those skilled in the art. Accordingly, it is to be understood that within the scope of the appended claims the invention may be practiced otherwise than as specifically described.

I claim:

1. In a gyro compass having a rotor case and a ballistic weight carried by said case, a damping device comprising a trough mounted on said rotor case, a viscous fluid carried in said trough, and a plurality of paddles each having opposed planar faces, said paddles being mounted on said weight in spaced and parallel relation and movable in said fluid in the planes of said faces.

2. In a gyro compass having a rotor case and a ballistic weight carried by said case, a damping device comprising a trough having a plurality of compartments, said trough being mounted on said rotor case, a viscous fluid carried in said compartments, and a plurality of paddles each having opposed planar faces, said paddles being mounted on said weight in spaced and parallel relation and movable in said fluid in the planes of said faces.

3. In a gyro compass having a rotor case and a ballistic weight carried by said case, a damping device comprising a trough having a plurality of communicating compartments, said trough being mounted on said rotor case, a viscous fluid carried in said compartments, and a plurality of paddles each having opposed planar faces, said paddles being mounted on said weight in spaced and parallel relation and movable in said fluid in the planes of said faces.

4. In a gyro compass having a rotor case and a ballistic weight carried by said case, a damping device comprising a trough, a plurality of slotted plates subdividing said trough into a plurality of communicating compartments, means to mount said trough on said rotor case, a viscous fluid carried in said compartments, and a plurality of paddles each having opposed planar faces, said paddles each being mounted on said weight in relatively spaced and parallel relation and movable in said fluid in one of said compartments in the planes of said faces.

5. In a gyro compass having a rotor case and a ballistic weight carried by said case, a damping device comprising a trough, a plurality of plates subdividing said trough into a plurality of compartments, the nether portion of said plates and the floor of said trough defining slots, means to mount said trough on said rotor case, a viscous fluid carried in said compartments, and a plurality of paddles each having opposed planar faces, said paddles being mounted on said weight in relatively spaced and parallel relation, at least one of said paddles being movable in said fluid in each of said compartments in the planes of said faces.

6. In a gyro compass having a rotor case and a ballistic weight carried by said case, a damping device comprising a trough, a plurality of plates subdividing said trough into a plurality of compartments, the nether portion of said plates and the floor of said trough defining slots, means to mount said trough on said rotor case, a viscous fluid characterized by small change in viscosity with change in temperature carried in said compartments, and a plurality of paddles each having opposed planar faces, said paddles being mounted on said weight in relatively spaced and parallel relation, at least one of said paddles being movable in said fluid in each of said compartments in the planes of said faces.

BERNARD J. BAECHER.

References Cited in the file of this patent

UNITED STATES PATENTS

| Number | Name | Date |
|---|---|---|
| 1,291,695 | Perry et al. | Jan. 14, 1919 |
| 1,773,412 | Thompson | Aug. 19, 1930 |
| 2,158,048 | Braddon | May 9, 1939 |
| 2,257,730 | Braddon | Oct. 7, 1941 |
| 2,464,516 | Kenyon | Mar. 15, 1949 |